Nov. 27, 1956 M. W. IVES 2,771,796
DRILL BIT DRESSING TOOL
Filed Feb. 13, 1953 2 Sheets-Sheet 1
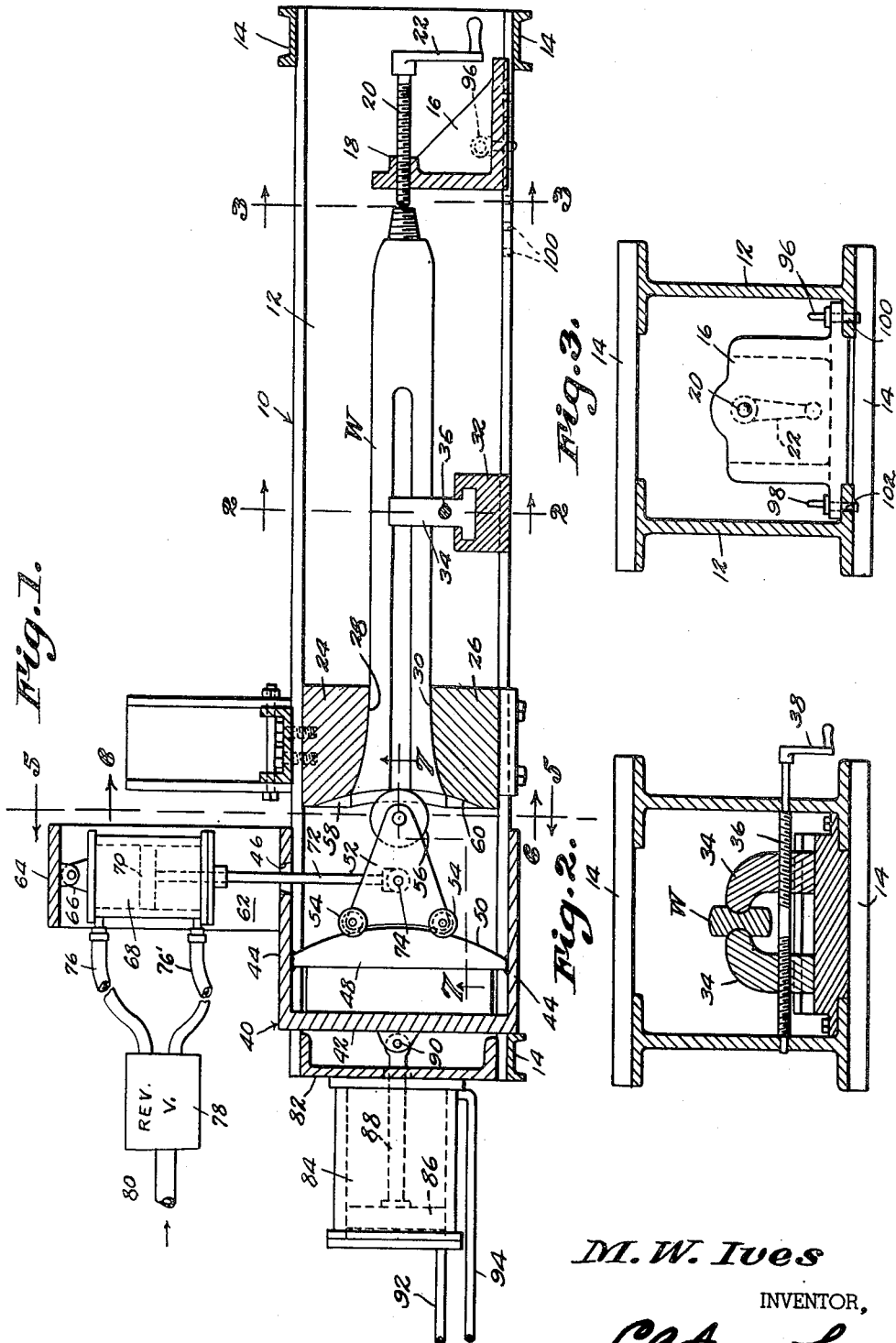
M. W. Ives
INVENTOR,
BY
ATTORNEYS.

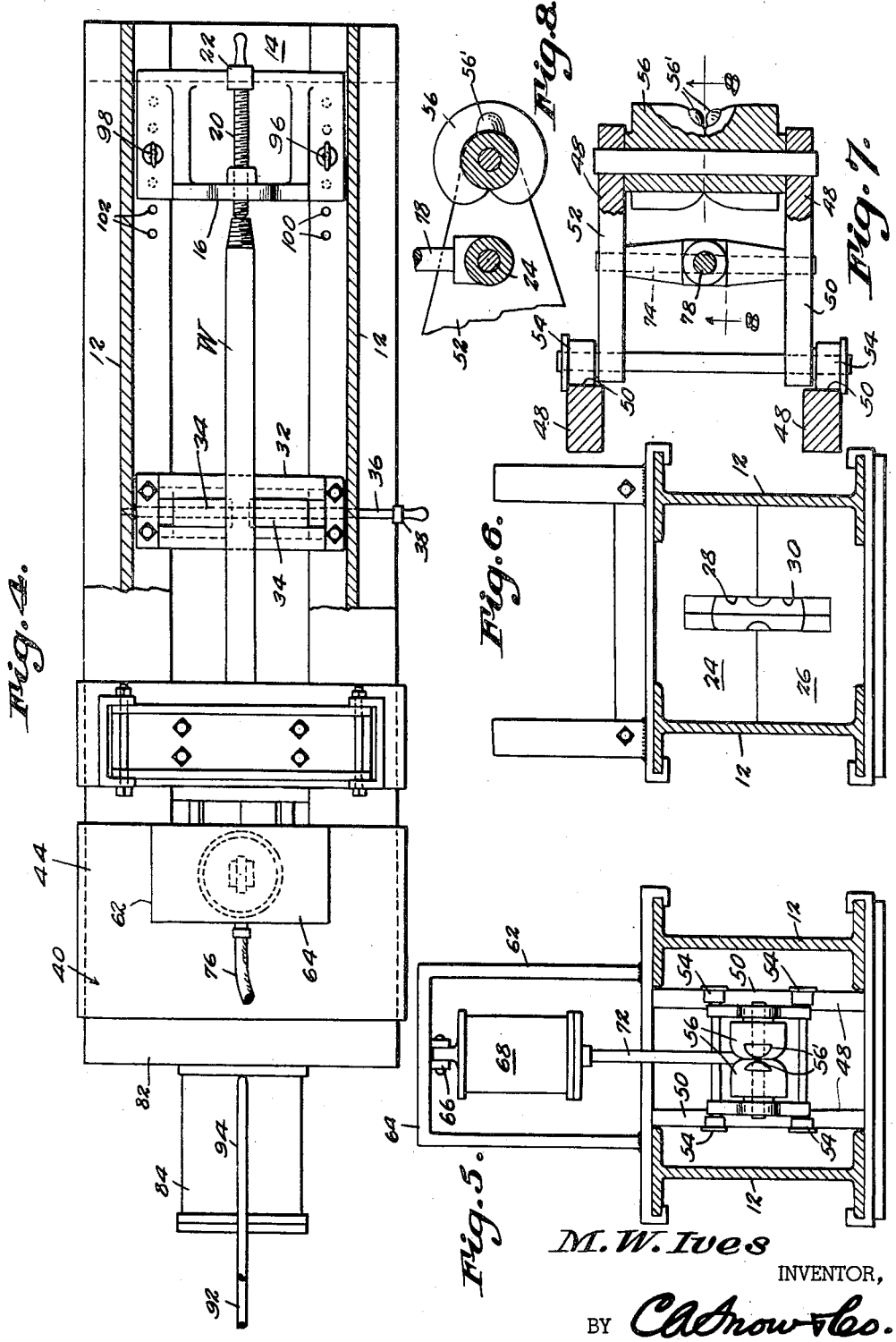

United States Patent Office 2,771,796
Patented Nov. 27, 1956

2,771,796

DRILL BIT DRESSING TOOL

Milo W. Ives, Ellenville, N. Y., assignor, by direct and mesne assignments, of fifty percent to Milo Warren Ives, Mt. Ivy, forty-nine percent to Irving G. Kennedy, Stony Point, and one percent to Alton W. Teale, Suffern, N. Y.

Application February 13, 1953, Serial No. 336,697

7 Claims. (Cl. 76—5)

This invention relates to a drill bit dressing tool and has for its primary object to shape the drilling end of a drill bit and to restore said drill bit to a serviceable condition after it has become worn or bruised through use.

Another object is to remove swollen portions from the end of a drill bit and press them into shape adjacent the cutting edges of the drill bit to thereby restore the drill bit to a cutting condition.

Still another object is to press the drill bit dressing roller into contact with the end of the drill bit under yielding pressure or positive pressure according to the fluid employed.

The above and other objects may be attained by employing this invention which embodies among its features a drill bit holder, a dressing roller mounted adjacent the holder for movement in an arcuate path across one end of a drill bit held in the holder, means for advancing the dressing roller toward the drill bit while it is being moved in the arcuate path, and means for moving the dressing roller in said arcuate path.

Other features include dies clamping the drill bit and holding it for proper shaping by the dressing roller and guiding the dressing roller as it moves across the end of the drill bit clamped in the dies.

Other features include a cross head mounted adjacent the end of the drill bit which is clamped in the dies, a convex track carried by the cross head with its convex edge disposed toward the end of the drill bit to be dressed, a cylinder mounted adjacent the cross head in axial alignment with the drill bit, a piston working within said cylinder and connected to the cross head for advancing the cross head toward the end of the drill bit to be dressed, a carriage mounted on the track to move transversely of the end of the drill bit to be dressed and means carried by the cross head and connected to the carriage for moving said carriage in an arcuate path adjacent the end of the drill bit to be dressed, and a dressing roller carried by the carriage and engaging the end of the drill bit to be dressed.

Still other features include a bracket carried by the cross head, a cylinder mounted in the bracket to move about an axis which is spaced from and lies perpendicular to the longitudinal axis of the drill bit, a piston working in said cylinder and a piston rod connected to the piston and to the carriage for moving the carriage and dressing roller carried thereby transversely of the axis of the drill bit with the dressing roller in contact with the adjacent end of the drill bit.

In the drawings,

Fig. 1 is a plan view of a drill bit dressing tool embodying the features of this invention, certain portions being shown in section more clearly to illustrate certain details of construction, Fig. 2 is a transverse sectional view taken substantially along the line 2—2 of Fig. 1, Fig. 3 is a transverse sectional view taken substantially along the line 3—3 of Fig. 1, Fig. 4 is a side view of the drill bit dressing tool showing certain portions in section, Fig. 5 is a transverse sectional view taken substantially along the line 5—5 of Fig. 1, Fig. 6 is a transverse sectional view taken substantially along the line 6—6 of Fig. 1, Fig. 7 is an enlarged longitudinal sectional view taken substantially along the line 7—7 of Fig. 1, and Fig. 8 is a fragmentary sectional view taken substantially along the line 8—8 of Fig. 7.

Referring to the drawings in detail a bed frame designated generally 10 comprises spaced parallel I beams 12 which are connected adjacent opposite ends by the suitable cross members 14 which serve to hold the I beams 12 in spaced parallel relation. Carried by the I beams adjacent one end of the tool 10 is a bracket 16 having extending therethrough an internally screw threaded opening 18, the axis of which lies midway between the upper and lower edges of the I beams and midway between opposite I beams. A screw threaded stem 20 threadedly engages the opening 18 and carries on the end thereof adjacent the adjacent end of the bed frame 10 a crank 22 by means of which the stem 20 may be rotated to advance or retract it relative to the bracket 16. Carried by the I beams 12 and extending therebetween intermediate the ends thereof, are drill bit shaping dies 24 and 26, which are formed in adjacent edges with recesses 28 and 30 respectively which flare outwardly as they recede from the ends of the dies 24 and 26 adjacent the bracket 16.

Mounted on the I beams 12 and extending thereacross between the dies 24 and 26 and the bracket 16 is a guide member 32 in which clamp jaws 34 are mounted to slide transversely between the I beams 12. Threadedly engaging aligned threaded openings in the jaws 34 and extending transversely between the I beams is a threaded stem 36, one end of which carries a crank 38 by means of which the stem may be rotated. The threads on the stem 36 and the threads in the opposite jaws 34 are arranged so that by turning the stem 36 in one direction, the jaws may be opened, while turning the threaded stem 36 in the opposite direction, the jaws will be closed.

Mounted for longitudinal sliding movement on the I beams 12 adjacent the end thereof remote from the bracket 16 is a cross head designated generally 40 comprising a cross member 42 having spaced parallel arms 44 which extend along the top and bottom faces of the I beams 12 toward the dies 24 and 26. These arms 44 extend between the I beams and formed in one of the arms near the end thereof adjacent the dies 26 is a transversely extending opening 46, the purpose of which will hereinafter appear. Carried by and extending between the arms 44 and disposed in spaced parallel relation to the webs of the I beams 12 are spaced parallel tracks 48 having convex faces 50 which are disposed toward the dies 24 and 26. A carriage 52 carrying rollers 54 which engage the convex faces of the tracks 50 rides on the tracks between the upper and lower edges of the I beams and in an arcuate path across the longitudinal axis of the tool. A drill bit dressing roller 56 is carried by the carriage adjacent the end thereof adjacent the dies 24 and 26, and formed in the ends of the dies 24 and 26 adjacent the carriage are transversely extending arcuate guide grooves 58 and 60 formed in the dies 24 and 26 respectively. The bottom walls of the guide grooves 58 and 60 coincide in curvature to the convex edges of the tracks 48 so that the carriage 52 moves on the tracks 48 the dressing roller 56 will be guided in the guideways 58 and 60.

Carried on the arm 44 of the cross head 40 having the opening 46 extending therethrough is an inverted U-shaped bracket 62 and depending from the bight portion 64 of the bracket 62 is an eye 66 having an opening extending therethrough, the axis of which lies spaced from and perpendicular to the longitudinal axis of the tool. Secured to and depending from the bracket 62 for movement about the axis of the opening in the eye 66 is a cylinder 68 having a piston 70 working therein. A piston rod 72 is connected at one end to the piston 70, and is pivotally connected as at 74 to the carriage 52 so that as the piston 70 moves within the cylinder 68, the carriage will move in unison therewith. Connected to the cylinder 68 and opening thereinto adjacent opposite ends thereof are fluid conduits 76 and 76' by means of which fluid is admitted to the cylinder on one or the other side of the piston 70 while fluid is discharged from the cylinder on the side of the piston remote from that against which fluid entering the cylinder is pressing. The conduits 76 and 76' are preferably connected through a suitable automatic reversing valve 78 which is connected through a suitable fluid conduit 80 to a source of fluid pressure (not shown). It will thus be seen that with fluid flowing through the conduit 80 from the source of fluid pressure to and through the reversing valve 78, the fluid will be alternately admitted to one or the other end of the cylinder 68 to cause the piston 70 to reciprocate therein. In this way the carriage 52 will be moved to and fro along the tracks 48 in an arcuate path so that the dressing roller 56 carried by the carriage will likewise move in an arcuate path transversely of the end of a drill bit held in the dies 24 and 26. Carried by and extending between the I beams 12 adjacent the end thereof carrying the cross head 40 is a transversely extending head plate 82, and carried by the head plate and extending longitudinally therefrom in axial alignment with the longitudinal axis of the tool is a cylinder 84. A piston 86 is mounted within the cylinder 84 to move longitudinally thereof, and carried by the piston 86 is a piston rod 88 which in turn is connected as at 90 to the cross head 40 and substantially midway between the ends of the cross member 42 carrying the arms 44. A fluid conduit 92 is connected to the cylinder 84 and opens thereinto through the end thereof remote from the head plate 82, and connected to and opening into the cylinder 84 adjacent the end thereof adjacent the head plate 82 is a conduit 94. These conduits are connected through suitable valve means (not shown) to a suitable source of fluid supply by means of which fluid under pressure may be introduced into the cylinder 84 either behind or in front of the piston 86, to thereby advance or retract the cross head 40 with relation to the dies 24 and 26.

With the work W constituting a drill bit clamped as illustrated in the drawings between the dies 24 and 26 and between the jaws 34, the flared portion bearing the cutting edges of the drill bit will be held in the flared portions of the dies 24 and 26 with the shank of the drill bit extending through the recesses 28 and 30 and the cutting end of the drill bit exposed toward the dressing rollers 56. Longitudinal adjustment of the drill bit within the dies can be achieved by turning the crank 22 and rotating the threaded stem 20 to bring it into engagement with the end of the drill bit remote from the cutting end thereof, and by reason of the reinforced bracket construction of the bracket 16, it is evident that heavy pressure may be exerted on the cutting end of the drill bit W. In preparing the drill bit for dressing, it is first heated to a temperature at which it becomes malleable and then is subsequently clamped between the dies 24 and 26 and the clamp jaws 34 after which fluid under pressure is admitted through the valve 78 through the conduit 80 and alternately enters the conduits 74 and 76 to cause the piston 70 to reciprocate within the cylinder 68 and consequently move the carriage 52 along the convex edges 50 of the tracks 48 to thereby cause the dressing rollers 56 to move in an arcuate path across the end of the drill bit held in the dies 24 and 26. Lugs 56' are formed on the periphery of the dressing roller 56 and are so spaced that they move into the water courses, forcing malleable metal which may lodge in the water courses during redressing, from such water courses. As the dressing roller passes across the end of the drill bit, the malleable metal of the drill bit will be pressed and shaped against the dies 24 and 26, and by admitting fluid pressure to the cylinder 84 through the conduit 92, the pressure of the dressing roller 56 may be increased to the desired extent. As the dressing rollers move off of the end edges of the drill bit the metal of the drill bit will be pressed against the dies and the rollers will enter the grooves 58 and 60 until the limit of the strokes of the piston 70 are reached. By employing the reversing valve 78, it is obvious that the reciprocation of the piston 70 may be rendered automatic so that an operator need only gauge the pressure exerted by the dressing rollers 56 against the end of the work or drill bit. In this way a drill bit which has been dulled or mutilated through use may be quickly restored to serviceable condition. Obviously by withdrawing the pins 96 and 98 carried by the bracket 16 and placing them in selected openings 100 and 102 in the flanges of the I beams 12, it will be obvious that a rough adjustment of the bracket 16 longitudinally of the drill bit dressing tool may be achieved so as to enable the device to accommodate drill bits of different lengths.

While in the foregoing there has been shown and described the preferred embodiment of this invention it is to be understood that minor changes in the details of construction combination and arrangement of parts may be resorted to without departing from the spirit and scope of the invention as claimed.

What is claimed is:

1. In a drill bit dressing tool, a drill bit holder which includes a pair of spaced parallel elongated guide rails, drill bit forming dies carried by the guide rails intermediate the ends thereof, clamp means carried by the guide rails for holding a drill bit in the dies and parallel with the guide rails, a cross head mounted on the guide rails adjacent the forming dies for movement in a rectilinear path toward and away from said dies, a convex track carried by the cross head and extending transversely thereof, the convex side of said track being disposed toward the forming dies, a carriage mounted on the track to move longitudinally over the convex side thereof, a drill bit dressing roller carried by the carriage for movement transversely over the adjacent end of a drill bit held in the dies, means carried by the guide rails and connected to the cross head for advancing the cross head toward a drill bit held in the dies, and means carried by the cross head and connected to the carriage for moving the dressing roller across the end of a drill bit held in the dies.

2. The structure recited in claim 1 in which the means for advancing the cross head toward a drill bit held in the dies comprises a cylinder carried by the guide rails and aligning with the drill bit, a piston working in the cylinder and connected to the cross head, and means connected to the cylinder for admitting fluid under pressure to the cylinder behind the piston.

3. The structure recited in claim 1 in which the means for moving the dressing rollers comprises, a cylinder carried by the cross head for movement about an axis which lies to one side of and perpendicular to the longitudinal axis of a drill bit held in the holder, a piston working in said cylinder and connected to the carriage for moving the carriage across the axis of the drill bit, and means connected to the cylinder for alternately admitting fluid under pressure into the cylinder adjacent opposite ends thereof to reciprocate the piston within the cylinder.

4. In a drill bit dressing tool, a drill bit holder which includes a pair of spaced parallel elongated guide rails, drill bit forming dies carried by the guide rails intermediate the ends thereof, clamp means carried by the guide rails for holding a drill bit in the dies and parallel with the guide rails, a cross head mounted on the guide rails adjacent to the forming dies for movement in a rectilinear path towards and away from said dies, a track carried by the cross head and extending transversely thereof, the track having one of its edges disposed towards the forming dies, a carriage mounted on the rack to move longitudinally thereover, a drill bit dressing roller carried by the carriage for movement transversely over the adjacent end of a drill bit held in the dies, means carried by the guide rails and connected to the cross head for advancing the cross head towards a drill bit held in the dies, and means carried by the cross head and connected to the carriage for moving the dressing roller across the end of a drill bit held in the disc.

5. The structure as recited in claim 4 in which the means for moving the dressing rollers comprises a cylinder carried by the cross head for movement about an axis which lies to one side of and perpendicular to the longitudinal axis of a drill bit held in the holder, means for moving said carriage across the axis of the drill bit, and lugs extending from the periphery of said drill bit dressing roller adapted to move into the water courses of the drill bit clearing said water courses of metal.

6. In a drill bit dressing tool a drill bit holder which includes a pair of spaced parallel elongated guide rails, drill bit forming dies carried by said guide rails intermediate the ends thereof, clamp means carried by the guide rails for holding a drill bit in said dies parallel with the guide rails, a carriage mounted for transverse movement over the cutting edge of the drill bit held within the dies, a forming roller carried by said carriage adapted to contact with the cutting edge of the drill bit, and lugs movable into the water courses of the drill bit being dressed removing metal therefrom.

7. In a drill bit conditioning tool a frame, a stationary drill bit holder member mounted on the frame, means for clamping a drill bit being conditioned in said stationary holder, a drill bit dressing roller member operating within the frame engageable with said drill bit, and lugs carried by one of said members engageable within the water courses of said drill bit, removing molten metal from said water courses.

References Cited in the file of this patent
UNITED STATES PATENTS

| | | |
|---|---|---|
| 1,040,282 | Crary | Oct. 8, 1912 |
| 2,443,814 | Curtis | June 22, 1948 |
| 2,615,353 | Ives | Oct. 28, 1952 |